US010419515B2

(12) United States Patent
Stone et al.

(10) Patent No.: US 10,419,515 B2
(45) Date of Patent: Sep. 17, 2019

(54) METHOD AND SYSTEM TO PROCESS NAVIGATION INFORMATION

(71) Applicant: eBay Inc., San Jose, CA (US)

(72) Inventors: Gregory Lincoln Stone, Santa Clara, CA (US); Jean-Michel Leon, Santa Clara, CA (US); James Everett Lloyd, San Francisco, CA (US); Eric Noel Billingsley, Campbell, CA (US); Daniel Graham Douglas, Los Gatos, CA (US); Todd Cameron Pringle, San Francisco, CA (US); Raghav Gupta, Sunnyvale, CA (US); Daniel Tsun Kao, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 15/066,695

(22) Filed: Mar. 10, 2016

(65) Prior Publication Data

US 2016/0197977 A1    Jul. 7, 2016

Related U.S. Application Data

(63) Continuation of application No. 11/322,572, filed on Dec. 30, 2005, now Pat. No. 9,311,398.
(Continued)

(51) Int. Cl.
*H04L 29/08* (2006.01)
*G06F 16/95* (2019.01)
(Continued)

(52) U.S. Cl.
CPC .......... *H04L 67/02* (2013.01); *G06F 16/9014* (2019.01); *G06F 16/90335* (2019.01);
(Continued)

(58) Field of Classification Search
CPC ........ G06F 17/30861; G06F 17/30949; G06F 17/30979; H04L 67/02; H04L 67/22; H04L 67/42
See application file for complete search history.

(56) References Cited

U.S. PATENT DOCUMENTS

| 7,319,882 | B2 | 1/2008 | Mendiola et al. |
| 7,366,755 | B1 * | 4/2008 | Cuomo ................... H04L 12/66 370/230 |

(Continued)

OTHER PUBLICATIONS

"U.S. Appl. No. 11/322,572 , Response filed Oct. 21, 2013 to Non Final Office Action dated Jul. 19, 2013", 11 pgs.
(Continued)

*Primary Examiner* — Khaled M Kassim
(74) *Attorney, Agent, or Firm* — Schwegman Lundberg & Woessner, P.A.

(57) ABSTRACT

A system to process navigation information includes at least one hardware processor and an information storage and retrieval platform executed by the at least one hardware processor. The information storage and retrieval platform is configured to receive a data request from a client, the data request including a client identifier that identifies the client, generate a network event in response to the data request received from the client, and generate, by the at least one hardware processor, a hash value from the client identifier. The information storage and retrieval platform is also configured to identify an address based on the hash value, determine a server by a lookup of the server from among a plurality of servers, the lookup being based on the identified address, and communicate the network event to the server.

19 Claims, 11 Drawing Sheets

Related U.S. Application Data

(60) Provisional application No. 60/736,906, filed on Nov. 15, 2005.

(51) Int. Cl.
*G06F 16/901* (2019.01)
*G06F 16/903* (2019.01)
*H04L 29/06* (2006.01)

(52) U.S. Cl.
CPC .............. *G06F 16/95* (2019.01); *H04L 67/22* (2013.01); *H04L 67/42* (2013.01)

(56) References Cited

U.S. PATENT DOCUMENTS

| | | | |
|---|---|---|---|
| 7,373,345 B2 | 5/2008 | Carpentier et al. | |
| 7,430,755 B1* | 9/2008 | Hughes | H04L 63/0823 726/3 |
| 7,970,863 B1* | 6/2011 | Fontaine | H04L 12/2834 709/217 |
| 2001/0054020 A1 | 12/2001 | Barth et al. | |
| 2002/0022995 A1 | 2/2002 | Miller et al. | |
| 2002/0049760 A1* | 4/2002 | Scott | G06F 17/30067 |
| 2002/0099723 A1* | 7/2002 | Garcia-Chiesa | G06F 17/30864 |
| 2002/0165954 A1 | 11/2002 | Eshghi et al. | |
| 2003/0004802 A1* | 1/2003 | Callegari | G06F 17/30241 705/14.13 |
| 2004/0077341 A1* | 4/2004 | Chandranmenon | H04W 36/14 455/418 |
| 2004/0225647 A1* | 11/2004 | Connelly | G06F 17/30864 |
| 2004/0225716 A1 | 11/2004 | Shamir et al. | |
| 2005/0091653 A1* | 4/2005 | Willehadson | G06F 9/505 718/100 |
| 2005/0283473 A1* | 12/2005 | Rousso | G06F 17/3064 |
| 2006/0026013 A1* | 2/2006 | Kraft | G06Q 10/10 705/1.1 |
| 2006/0041550 A1* | 2/2006 | Bennett | G06F 17/30867 |
| 2006/0074918 A1* | 4/2006 | Nakatsuka | G06F 3/0613 |
| 2006/0080298 A1* | 4/2006 | Kelly | G06F 17/30867 |
| 2006/0167857 A1* | 7/2006 | Kraft | G06F 17/30528 |
| 2006/0182128 A1* | 8/2006 | Nakata | H04L 41/048 370/401 |
| 2006/0265508 A1* | 11/2006 | Angel | H04L 29/12047 709/230 |
| 2007/0067304 A1* | 3/2007 | Ives | G06Q 30/02 |
| 2007/0112780 A1 | 5/2007 | Stone et al. | |

OTHER PUBLICATIONS

"U.S. Appl. No. 11/322,572, Examiner Interview Summary dated Feb. 20, 2014", 3 pgs.
"U.S. Appl. No. 11/322,572, Examiner Interview Summary dated Mar. 16, 2015", 3 pgs.
"U.S. Appl. No. 11/322,572, Examiner Interview Summary dated Sep. 5, 2014", 3 pgs.
"U.S. Appl. No. 11/322,572, Final Office Action dated Jan. 8, 2009", 13 pgs.
"U.S. Appl. No. 11/322,572, Final Office Action dated Mar. 26, 2010", 16.
"U.S. Appl. No. 11/322,572, Final Office Action dated Nov. 22, 2013", 14 pgs.
"U.S. Appl. No. 11/322,572, Final Office Action dated Dec. 4, 2014", 16 pgs.
"U.S. Appl. No. 11/322,572, Non Final Office Action dated Apr. 30, 2014", 15 pgs.
"U.S. Appl. No. 11/322,572, Non Final Office Action dated Jul. 19, 2013", 13 pgs.
"U.S. Appl. No. 11/322,572, Non-Final Office Action dated Jan. 29, 2009", 12 pgs.
"U.S. Appl. No. 11/322,572, Non-Final Office Action dated Aug. 6, 2009", 13 Pgs.
"U.S. Appl. No. 11/322,572, Notice of Allowance dated Dec. 7, 2015", 17 pgs.
"U.S. Appl. No. 11/322,572, Response filed Mar. 4, 2015 to Final Office Action dated Dec. 4, 2014", 14 pgs.
"U.S. Appl. No. 11/322,572, Response filed May 27, 2010 to Final Office Action dated Mar. 26, 2010", 12 pgs.
"U.S. Appl. No. 11/322,572, Response filed Aug. 26, 2014 to Non Final Office Action dated Apr. 30, 2014", 15 pgs.
"U.S. Appl. No. 11/322,572, Response filed Jan. 6, 2010 to Non Final Office Action dated Aug. 6, 2009", 12 pgs.
"Application Serial No. Response filed Apr. 8, 2009 to Non Final Office Action dated Jan. 8, 2009", 10 pgs.

* cited by examiner

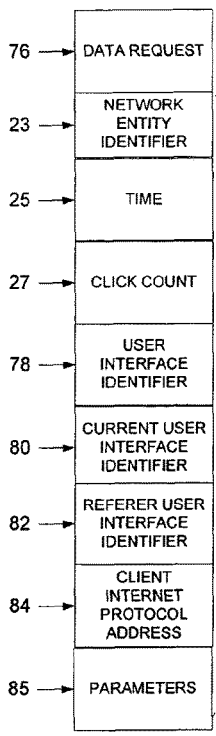
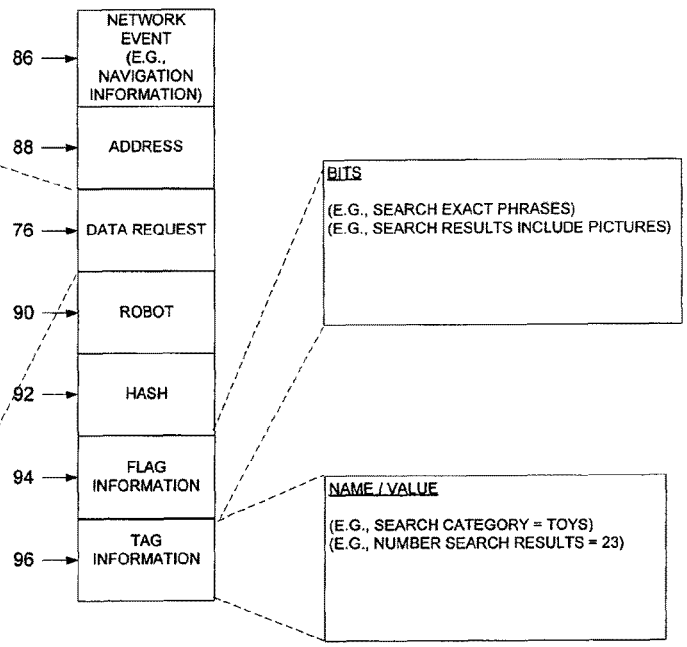
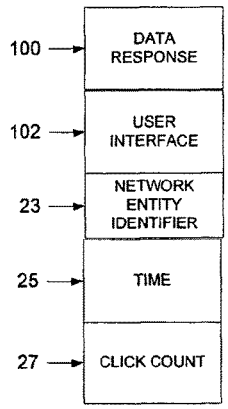
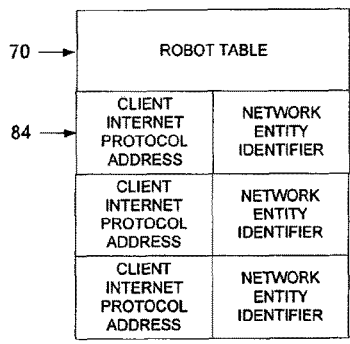
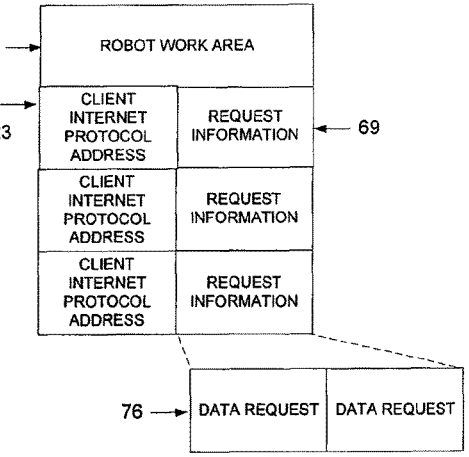

METHOD AND SYSTEM TO PROCESS NAVIGATION INFORMATION

RELATED APPLICATIONS

This application is a continuation of and claims the benefit of priority to U.S. patent application Ser. No. 11/322,572, filed on Dec. 30, 2005, which claims the benefit of priority to U.S. Provisional Patent Application Ser. No. 60/736,906, filed Nov. 15, 2005, the benefit of priority of each of which is claimed hereby, and each of which are incorporated by reference herein in its entirety.

TECHNICAL FIELD

An embodiment relates generally to the technical field of network processing and, in one example embodiment, to a method and system to process navigation information.

BACKGROUND

Most websites with sizeable traffic require thousands of application servers to respond to data requests from users. Such a website may include application servers that may be organized according to server-farms or pools that may be respectively located at different physical locations and respond to data requests for different types of user interfaces. For example, one pool of application servers may responds to data requests for user interfaces that contain search results and another pool of application servers may respond to data requests for user interfaces that contain user profile information.

Websites that desire to track information (e.g., navigation information) associated with a user that is navigating the website may maintain a log-file at each application server. Unfortunately, tracking all the navigation information of a specific user requires accessing the log-files residing on the thousands of machines in different physical locations and merging the information according to Internet protocol address to maintain the identify of the user and according to time to maintain the chronology of the user activity. This operation is expensive and typically performed off-line thereby introducing a lag between the time the data is recorded in the log-file and the time the data may be available for analysis.

SUMMARY

According to a first aspect of the disclosure there is described a method to process navigation information. The method includes receiving a data request from a network entity, the data request including a network entity identifier that uniquely identifies the network entity; generating a network event based on the data request, the network event including the navigation information; communicating the network event to a first server that is distinguished from a first plurality of servers based on the network entity identifier.

According to a second aspect of the disclosure there is described a method to process navigation information. The method includes receiving a data request from a network entity, the data request including a network entity identifier that uniquely identifies the network entity; generating a network event based on the data request, the network event including the navigation information; and analyzing the network event in real time.

BRIEF DESCRIPTION OF THE DRAWINGS

An embodiment of the present disclosure is illustrated by way of example and not limitation in the figures of the accompanying drawings, in which like references indicate similar elements and in which:

FIG. 4 is a representation of a data request, according to one embodiment;

FIG. 5 is a representation of a network event, according to one embodiment;

FIG. 6 is a representation of data response, according to one embodiment;

FIG. 7A is a block diagram illustrating a robot table, according to one embodiment;

FIG. 7B is a block diagram illustrating a robot work area, according to one embodiment;

DETAILED DESCRIPTION

A method and system to process navigation information are described. In the following description, for purposes of explanation, numerous specific details are set forth in order to provide a thorough understanding of the present disclosure. It will be evident, however, to one skilled in the art that the present disclosure may be practiced without these specific details.

Figure 1:
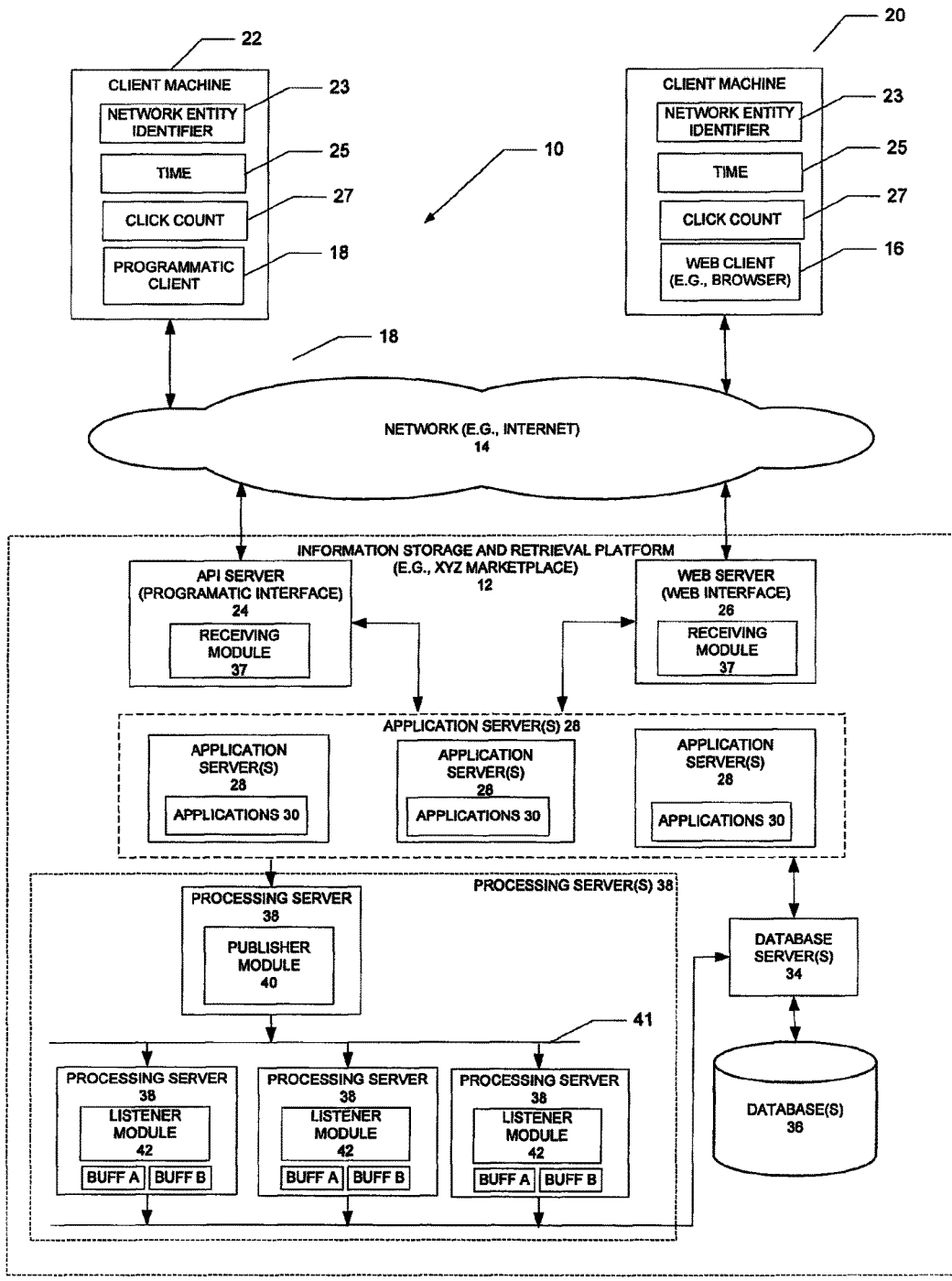
FIG. 1 is a network diagram depicting a system, according to one example embodiment of the present disclosure.

FIG. 1 is a network diagram depicting a system 10, according to one example embodiment of the present disclosure, having a client-server architecture. A platform, in the example form of an information storage and retrieval platform 12, provides server-side functionality, via a network 14 (e.g., the Internet) to one or more clients 20, 22 (e.g., network entities). FIG. 1 illustrates, for example, a web client 16 (e.g., a browser, such as the INTERNET EXPLORER browser developed by Microsoft Corporation of Redmond, Wash. State) executing on the client machine 20 and a programmatic client 18 or software agent (e.g., a robot such as the PIXIEROBOT, an automated Web Scraping Tool, made by PixiEware™ Software of Ontario, Canada or WEB SCRAPER PLUS made by velocityscape of Scottsdale, Ariz.) executing on client server machine 22. Further, the client machines 20, 22 are shown to store cookies including a network entity identifier 23, a time 25, and a clock count 27.

Turning specifically to the information storage and retrieval platform 12, an application program interface (API) server 24 and a web server 26 are coupled to, and provide programmatic and web interfaces respectively to, one or more application servers 28. The application servers 28 may be aggregated into pools and include applications 30 that may be dedicated to respond to specific types of data requests from the client machines 20, 22. For example, one pool of applications 30 may be dedicated to processing queries from the client machines 20, 22 and returning a user interface (e.g., data response) that includes search results. Another pool of applications 30 may be dedicated to processing requests from the client machines 20, 22 to return a user interface that displays a user profile. In addition, the applications 30 may generate a network event that includes navigation information for each data request/data response processed. Thus, user activity may be tracked for all users of the information storage and retrieval platform 12. The application servers 28 are, in turn, shown to be coupled to a processing server 38 that hosts a publisher module 40 and database servers 34. The publisher module 40 receives network events from the application servers 28 and communicates the network events over a bus 41 to multiple processing servers 38 that host respective listener modules 42. The host listener modules 42, in turn, are shown to communicate with database servers 34 that may be utilized to store and retrieve information to and from the databases 36. The components utilizing the bus 41 (e.g., publisher module 40, listener modules 42, etc.) may be publish/subscribe middleware software that may be embodied as TIBCO RENDEZVOUS™, a middleware or Enterprise Application Integration (EAI) product developed by Tibco Software, Inc. of Palo Alto, Calif.

While the system 10 shown in FIG. 1 employs a client-server architecture, the present disclosure is of course not limited to such an architecture, and could equally well find application in a distributed, or peer-to-peer, architecture system. The receiving module 37, applications 30, publisher module 40, and listener modules 42 may also be implemented as standalone software programs, which do not necessarily have networking capabilities.

The web client 16, it will be appreciated, accesses the various services and functions provided by applications via the web server 26 supported by the web server 26. Similarly, the programmatic client 18 accesses the various services and functions provided by the applications 30 via the programmatic interface provided by the API server 24.

The information storage and retrieval platform 12 may be embodied as the WORLDS ONLINE MAKETPLACE provided by eBay of San Jose, Calif. For example, sellers may post listings or items for goods and services that may be purchased by buyers or won in auctions by bidders.

Processing Navigation Information

Figure 2:
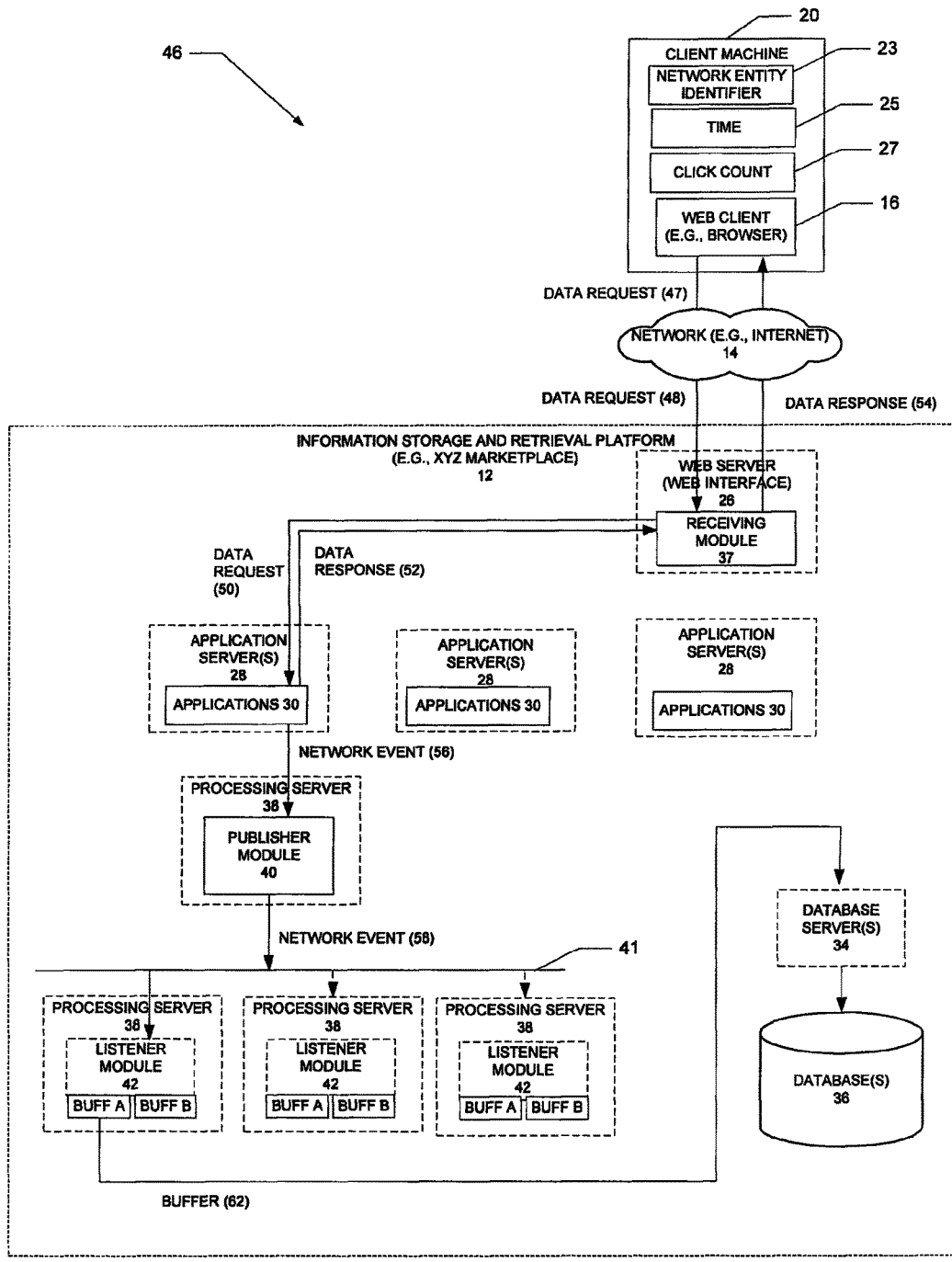
FIG. 2 is a block diagram illustrating a system, according to an example embodiment of the present disclosure.

FIG. 2 is a block diagram illustrating a search system 46 as embodied in the information storage and retrieval platform 12, according to an example embodiment of the present disclosure. The search system 46 is presented to provide an overview of processing navigation information.

At operation 47, a user at the client machine 20 utilizes the web client 16 (e.g., web browser) to a query for "Dr. Seuss Books." The web client 16 generates a data request that includes the query and may further include a network entity identifier 23, a time 25, and a click count 27. In one embodiment, the network entity identifier 23 may be a thirty-two character hexadecimal value that may be utilized to uniquely identify the client machine 20 (e.g., network entity). The time 25 chronicles the time the previous data request was received from the client machine 20. The click count 27 is an ascending count (e.g., 1, 2, 3, . . . etc.) that identifies a particular data request within a particular session, as described more fully below.

At operation 48, the receiving module 37 receives a data request from the client machine 20 and determines which application server(s) 28 are appropriate to process the query. For example, application server(s) 28 that process queries and generate user interfaces that include search results may be appropriate. At operation 50, the receiving module 37 routes the data request to the appropriate application server 28. At operation 52, the application 30 generates a data response (e.g., search results) based on the query and communicates the data response back to the receiving module 37 which, in turn, at operation 54, communicates the data response back to the client machine 20. Further, the application 30 may generate a network event that describes the data request/data response (e.g., navigation information) and, at operation 56, communicates the network event to the publisher module 40. The publisher module 40 receives the network event and generates a hash value based on the network entity identifier 23. The hash value may be used to determine an address of a listener module 42. At operation 58, the publisher module 40 uses the address to communicate the network event to the appropriate listener module 42 over the bus 41. At operation 60, the listener module 42 receives the network event and stores the network event in a buffer A or B. Further, at operation 62 the listener module 42 periodically writes the contents of a buffer A or B to the database 36.

The above example overview describes a data request that included a query for a user interface that contains search results; however, it will be appreciated that other embodiments may describe a data requests for other types of user interfaces (e.g., web pages).

Session

In one embodiment a session may be defined as a set of data requests where the time between any two data request is less than or equal to a predetermined time period (e.g., thirty minutes.) Thus, a data request that is received thirty one minutes after receiving the previous data request may be considered the first data request in the next session. Other embodiments may define a session to be longer or shorter in duration.

Successive data requests within a session are chronicled with the click count 27. For example, the click count of the first data request in a session is one and the click count of the second data request in the session is two. The click count 27 may be copied from the data request into the network event data structure 86 to chronicle the click count 27. The click count 27 may be reset to one by the application 30 based on the time 25. For example, the application 30 may reset the click count to one if the difference between the current time and the time 25 in the data request is greater than the predetermined session threshold.

Generating and Maintaining Cookies

Client machines 22, 20 may generate data requests without cookie information (e.g., network entity identifier 23, time 25, click count 27). For example a web client 16 that has never communicated a data request to the information storage and retrieval platform 12 may not include a network entity identifier, time 25, or a click count 27 in the data request. Further, client machines 22 with programmatic clients (e.g., robots) typically do not permit cookies to be stored at the client machine 22 and consequently may generate data requests to the information storage and retrieval platform 12 without cookie information.

The application(s) 30 may respond to a data request without cookie information by generating the cookie information and appending the cookie information to the response (e.g., data response). At the client machines 20, 22 the cookie information may be stored in a local storage device (e.g., cache, disk, etc.) and communicated back to the information storage and retrieval platform 12 the next data request.

Analyzing Network Events

The listener modules 42 may analyze the network events in real-time or offline. The listener modules 42 analyze network events in real-time by reading network events as they are received from the bus 41. The listener modules 42 may analyze network events offline by reading network events from the database 36.

An example of analyzing the network events in real-time may include the listener modules 42 at each processing server 38 collecting a requested webpage identifier (e.g., user interface identifier) from each network event responsive to reception of the network event data structure 86. The listener module 42 may collect the user interface identifier for a period of time to generate a report that maintains a frequency of data requests for a type of webpage (e.g., user interface). Such a report may be used to identify the most frequently requested type of user interface, the median requested type of user interface and the least frequently requested type of interface for the period of time. Further, it will be appreciated that not every network event that may be generated for the period of time requires collection; rather, sampling may be employed. Sampling may be employed by utilizing fewer than all of the listener modules 42. For example, if ten listener modules 42 may be used to process all the network events then five listener modules 42 may be used to process fifty percent of the network events. Note that employing sampling in this manner may maintain the integrity of a session because all network events originating from a particular network entity should be processed by the same listener module 42.

An example of analyzing the network events in an offline mode may include the listener modules 42 at each processing server 38 collecting the network events to identify robots. Programmatic clients 18 (e.g., robots) present a special problem because they sometimes prevent cookies from being stored on the client machine 22 where they execute. For example, before a robot is identified, each network event originating from the robot may be stored with a different network entity identifier 23 but the same client internet protocol address. Analyzing the network events in the offline mode enables the listener module 42 to identify this pattern. In response, the listener module 42 may allocate a network entity identifier 23 that may be stored in the database 36 in association with the client internet protocol address. Accordingly, the application 30 may utilize the database 36 to identify a network event as associated with a robot based on the client internet protocol address and update the network event with the network entity identifier 23 provided in the robot table.

Figure 3:
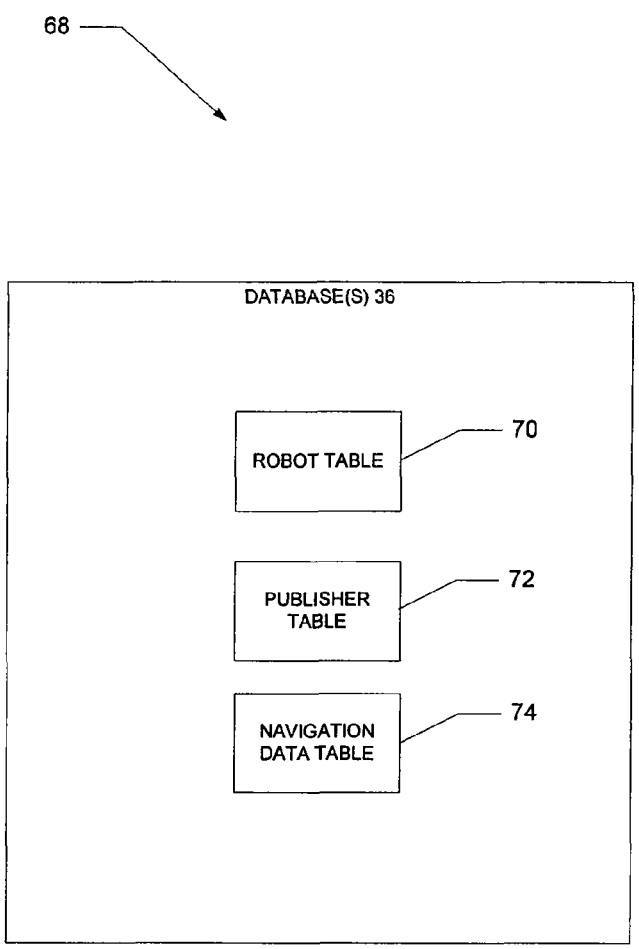
FIG. 3 is a block diagram illustrating database tables, according to one embodiment.

FIG. 3 is a block diagram illustrating database tables 68 according to one embodiment, stored at the information storage and retrieval platform 12. The database tables 68 include a robot table 70, a publisher table 72, and a navigation data table 74. The robot table 70 may be utilized by the application 30 to determine whether the client internet protocol address contained in a data request maps to a network entity identifier 23 associated with a robot. The publisher table 72 may be utilized by the publisher module 40 to route the network event to the appropriate listener module 42. The navigation data table 44 may be used to store network events for subsequent retrieval and analysis.

FIG. 4 is a representation of a data request 76, according to one embodiment. The data request 76 is generated by a web client 16 and is shown to include a network entity identifier 23, a time 25, a click count 27, a user interface identifier 78, a current user interface identifier 80, a referrer user interface identifier 82, a client Internet protocol (IP) address 84, and parameters 85.

The network entity identifier 23 identifies the network entity that communicated the data request 76 to the information storage and retrieval platform 12. The time 25 chronicles the transmission time of the last data request originating from the network entity identified by the network entity identifier 23 in the data request 76. The click count 27 identifies the selection in the current session (e.g., first, second, third, etc.). The user interface identifier 78 identifies the user interface requested with the data request 76. For example, the user interface identifier 78 may identify a user interface that contains search results (e.g., based on a query). Another example of the user interface identifier 78 may include a user interface identifier 78 that identifies a user profile page. The current user interface identifier 80 identifies the user interface currently displayed at the client machine 20. The referrer user interface identifier 82 identifies the user interface previously displayed at the client machine 20. The client Internet protocol (IP) address 84 identifies the Internet protocol (IP) address from which the data request 76 was communicated. Finally, the parameters field 85 may include additional information necessary to process the data request 76 (e.g., query parameters, keywords, user name, etc.).

FIG. 5 is a representation of a network event data structure 86, according to one embodiment. The network event data structure 86 includes navigation information and is generated by the application 30 in response to receiving the data request 76. The network event data structure 86 includes an address 88, the data request 76, a robot flag 90, a hash 92, flag information 94 and tag information 96. The address 88 may be used to route the network event data structure 86 to a particular processing server 38 and listener module 42. The data request 76 has already been described and is included in the network event data structure 86. The robot flag 90 indicates whether or not the client Internet protocol (IP) address 84 in the data request 76 may be associated with a robot. For example, an asserted flag may indicate a robot. The hash 92 may be a value generated by the publisher module 40 based on the network entity identifier 23. The hash 92 may be used to route the network event data structure 86 to one of multiple listener modules 42. The hash algorithm may be selected to generate a hash for any desired number of listener modules 42. For example, the hash 92 algorithm may be selected to generate hash values for ten or twenty listener modules 42 operating on respective processing servers 38. Expansion of the number of hash values may facilitate the addition of processing servers 38 to support additional network traffic due to an increase in the number of network events. The flag information 94 includes bits or flags that may be utilized to register data that is collected from the data request 76 and/or the data response 100. For example, a bit that corresponds to data collected from the data request 76 may be asserted to indicate the user requires a search with exact matching of the words in the query. Another bit may correspond to data that is collected from the data response 100. For example, a bit may be asserted to indicate the search results included a picture. In addition, the tag information 96 may include name/value pairs that may be utilized to register data that is collected from the data request 76 and/or the data response 100. For example, a name/value pair that corresponds to data collected from the data request 76 may indicate whether or not a query may be performed across the category "toys." Another name/value pair may correspond to data that is collected from the data response 100. For example, a name/value pair may indicate the number of search results to be twenty-three.

FIG. 6 is a representation of a data response 100, according to one embodiment. The data response 100 includes a user interface 102, the network entity identifier 23, the time 25, and the click count 27. The data response 100 may be generated by the application 30 responsive to receiving the data request 76. The user interface 102 may be identified with the user interface identifier 78 in the data request 76. For example, the user interface may include search results that were generated in response to a query from a user operating a web client 16 (e.g., browser). The network entity identifier 23 identifies the network entity that generated the data request 76. The time 25 chronicles the time the data request 76 (e.g., corresponding to the present data response 100) was received from the client machine 20. The click count 27 may be copied from the data request 76 and incremented by one. Subsequent to communication of the data response 100 back to the client machine 20, 22, the network entity identifier 23, time 25, and click count 27 are written to a storage device on the client machine 20, 22 as cookies.

FIG. 7A is a block diagram illustrating a robot table 70, according to one embodiment. Each entry in the robot table 70 may include a client Internet protocol (IP) address 84 and a network-entity identifier 23. An entry in the robot table 70 indicates that a robot operates at the client internet protocol address 84. The robot table 70 may be used by the application 30 to update the robot flag 90 field in the network event data structure 86 and to update the network entity identifier 23 in the network event data structure 86.

FIG. 7B is a block diagram illustrating a robot work area 71, according to one embodiment. Each entry in the robot work area 71 may include a client Internet protocol (IP) address 84 and request information 69 that further includes one or more data requests 76. The robot work area 71 may be used by the listener modules 42 to identify robots and update the robot table accordingly.

Figure 8:
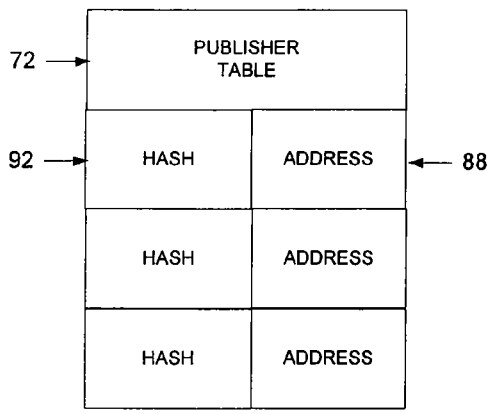
FIG. 8 is a block diagram illustrating a publisher table, according to one embodiment.

FIG. 8 is a block diagram illustrating a publisher table 72, according to one embodiment. Each entry includes a hash 92 and an address 88. The hash 92 may be generated by the publisher module 40 based on the network entity identifier 23. The publisher module 40 may utilize the publisher table 72 to map the hash 92 to an address 88 that may be utilized to identify a particular listener module 42 on the bus 41.

Figure 9:
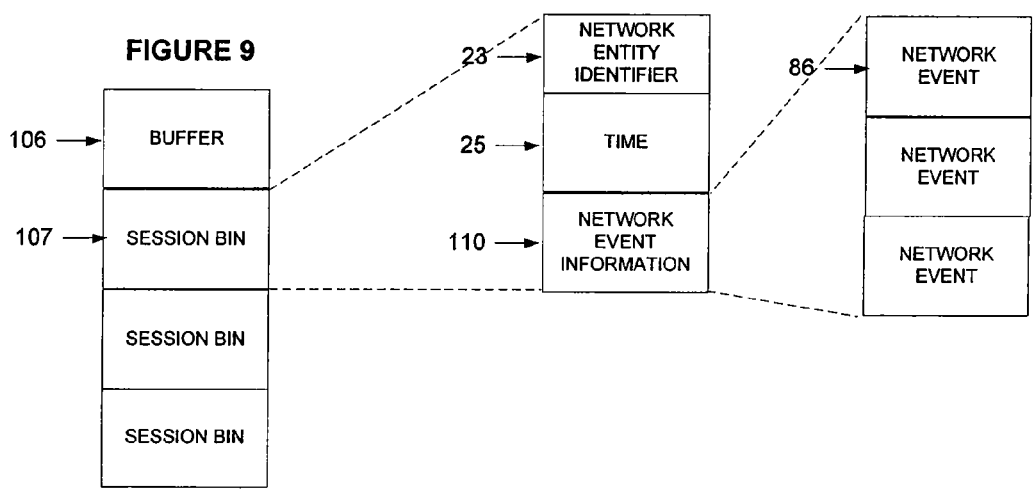
FIG. 9 is a block diagram illustrating a buffer, according to one embodiment.

FIG. 9 is a block diagram illustrating a buffer 106, according to one embodiment. The buffer 106 is duplicated on each processing server 38 and may be identified as buffers "A" and "B." For example one buffer 106 may be used by a listener module 42 to store network events 86 while the other buffer 106 may be used by the listener module 42 to flush or write network events to the database 36. Periodically the listener module 42 may switch the roles of the buffers.

Buffer 106 is shown to include session bins 107. Each session bin 107 may be used to collect network events 86 for a particular session for a particular network entity. To this end, each session bin 107 includes a network entity identifier 23, a time 25, and network event information 110. The network entity identifier 23 identifies the network entity that caused the network event data structure 86 to be generated. The time 25 chronicles the time that the data request was received that was used to generate the network event data structure 86. The network event information 110 includes the network events 86 for the particular session for the particular network entity.

Figure 10:
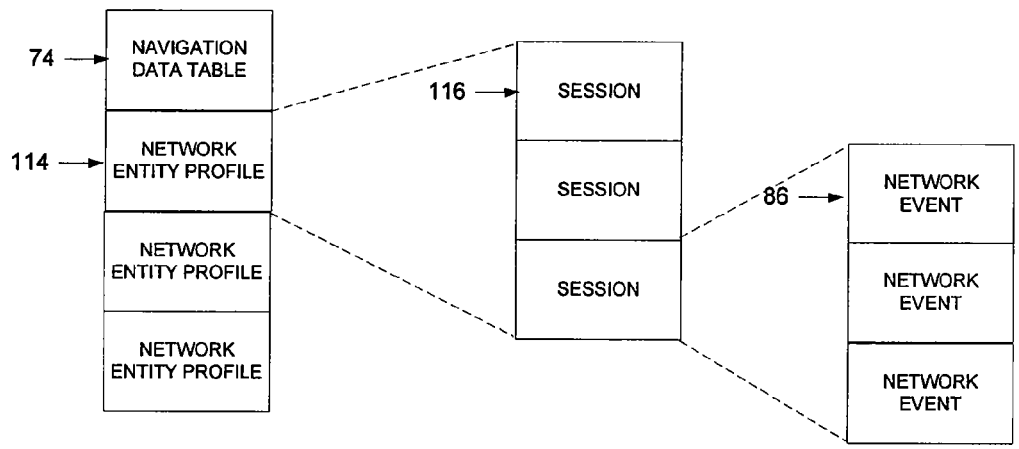
FIG. 10 is a block diagram illustrating a navigation data table, according to one embodiment.

FIG. 10 is a block diagram illustrating an example navigation data table 74. The navigation data table 74 is shown to include network entity profiles 114. The network entity profiles 114 correspond to network entities. Each network entity profile 114 may be associated with multiple sessions 116. Each session 116, in turn, may be associated with multiple network events 86. The navigation data table 74 may be used to facilitate long term storage of network events 86. Further, the listener module 42 may analyze the network information in the navigation data table 74 to generate reports and/or trigger other activity.

Figure 11:
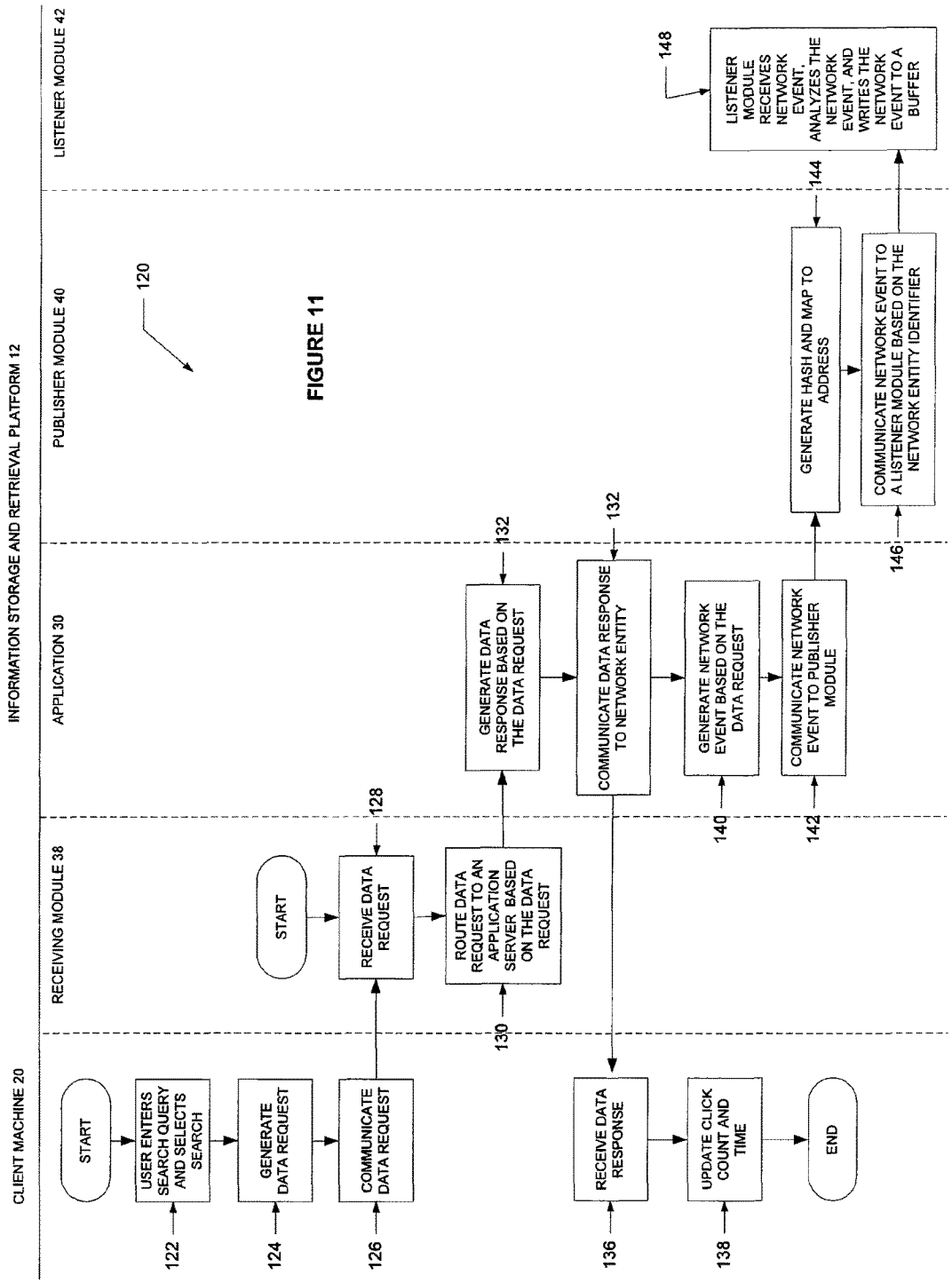
FIG. 11 is a flowchart illustrating a method, according to one embodiment, to process navigation information.

FIG. 11 is a flow chart illustrating the method 120, according to one embodiment, to process navigation information. Illustrated on the left are operations performed by the client machine 20, and illustrated on the right are operations performed by the information storage and retrieval platform 12.

The method 120 commences at operation 122 with a user operating the client machine 20. For example the user may enter a search query "Dr. Seuss" to search for Dr. Seuss books that may be listed for sale on the information storage and retrieval platform 12. The information storage and retrieval platform 12 does not require that the user be logged on (e.g., provide a user name and password) to capture navigation information as the user navigates through the user interfaces served by the information storage and retrieval platform 12; rather, the user may navigate anonymously.

At operation 124, the web client 16 at the client machine 20, generates a data request 76. For example, the data request 76 may include a network entity identifier 23, a time 25, and a click count 27 that are copied from cookies at the client machine 20 to the data request 76. Further, the data request 76 may include a user interface identifier 78 that may contain search results, a referrer user interface identifier 82, a client Internet protocol (IP) address 84, and parameters 85 that may include the keywords "Dr. Seuss." At operation 126, the web client 16 communicates the data request 76 to the information storage and retrieval platform 12.

At operation 128, the receiving module 37 receives the data request 76. The receiving module 37 utilizes the user interface identifier 78 to identify the appropriate application server 28. For example, the present data request 76 may include a user interface identifier 78 that identifies a user interface that contains search results. Accordingly, a processing server 38 that processes queries to generate user interfaces that contain search results may be selected.

At operation 130, the receiving module 37 routes the data request 76 to the appropriate application server 28. At operation 132, an application 30, at the application server 28, generates a data response 100 based on the data request 76. For example, the application 30 may generate a user interface that contains search results; copy the network entity identifier 23 from the data request 76 to the data response 100; stamp the data response 100 with the current time 25; and, update the click count 27. For example, the application 30 may get the click count 27 from the data request, increment the click count 27 by one, and store the incremented click count 27 in the data response 100 or if the different between the current time and the time 25 in the data response 100 is greater than the session time then the application 30 may set the click count 27 in the data response 100 to one.

At operation 134, the application 30 communicates the data response to the client machine 20.

At operation 136, the client machine 20 receives the data response 100 and at operation 138 the client machine 20 stores the network entity identifier 23, the time 25, and the click count 27 as one or more cookies. Finally, the web client 16 displays the user interface 102 to the user operating the client machine 20.

Figure 12:
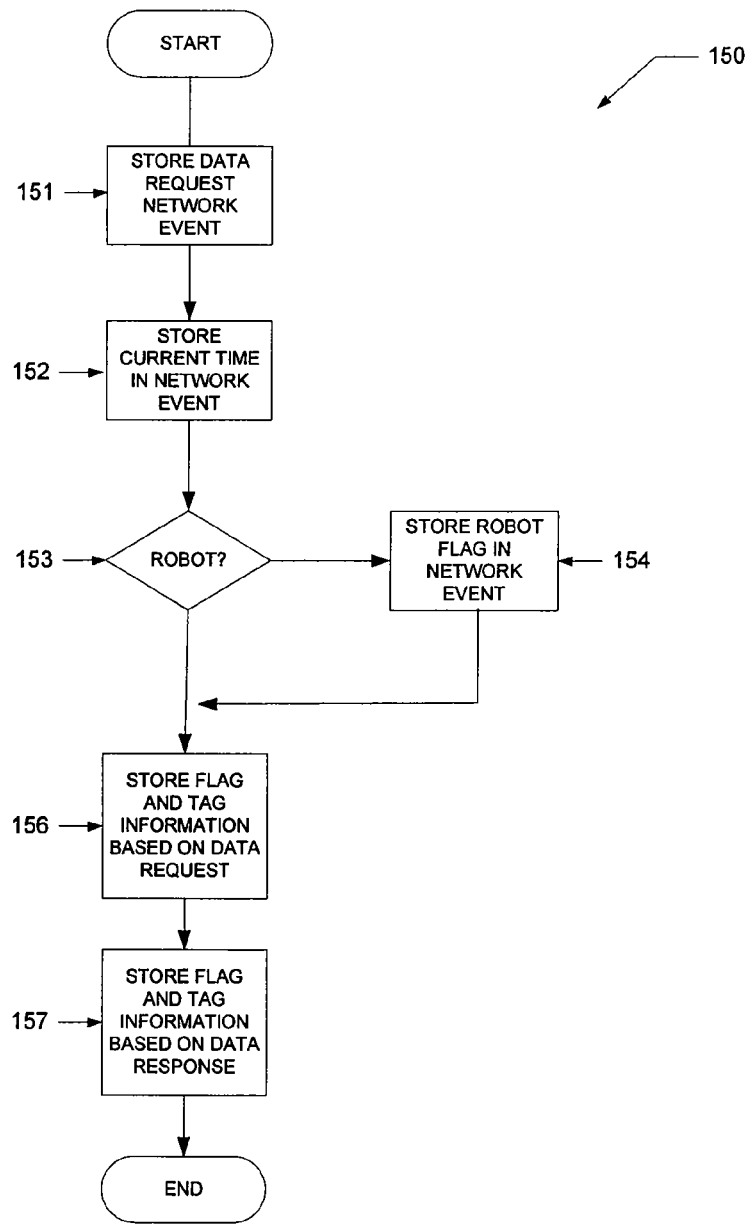
FIG. 12 is a flowchart illustrating a method, according to one embodiment, to generate a network event.

At operation 140, at application server 28, the application 30 generates a network event data structure 86 that includes navigation information that describes the keyword search and the results that are generated, as described on FIG. 12, according to one embodiment.

At operation 142, the application 30 communicates the network event data structure 86 to the publisher module 40.

At operation 144, at the processing server 38, the publisher module 40 receives the network event data structure 86 and generates a hash value. For example, the publisher module 40 may include a hash algorithm to generate a value based on two digits of the 32 digit network entity identifier 23 to generate a value between 0 and 256. Next, the publisher module 40 may use the hash value 92 to perform a lookup in the publisher table 72 to find the corresponding address 88. The publisher module 40 writes the address 88 into the network event data structure 86.

At operation 146, the publisher module 40 publishes the network event data structure 86 to the bus 41 based on the address 88 thereby communicating the network event data structure 86 to the appropriate processing server 38 and listener module 42. For example, all the listener modules 42 that execute on the respective processing servers 38 may receive the network event data structure 86; however, only a single listener module 42 may store the network event data structure 86 in the buffer 106. Specifically, the listener module 42 that is designated to process the address 88 associated with the network event data structure 86 may store the network event data structure 86 in the buffer 106.

At operation 148, the listener module 42 receives the network event data structure 86, analyzes the network event data structure 86 in real time, and writes the network event data structure 86 to the appropriate buffer 106. For example, the listener module 42 may analyze the network event by reading the user interface identifier 78 from the network event data structure 86 and registering the request for the user interface. The listener module 42 may register requests for a predetermined period of time to generate a report that maintains a frequency of data requests for types of user interfaces (e.g., webpage). Such a report may be used to identify the most frequently requested type of user interface, the median requested type of user interface and the least frequently requested type of interface for the period of time. In the present example, the listener module 42 may register a request for user interface that contains search results, more specifically for a user interfaces that contains search results that are generated in response to a keyword search. It will be appreciated that the analysis of the network event data structure 86 is optional. It will further be appreciated that multiple types of navigation information may be read from the network event data structure 86 and stored to generate multiple types of reports.

The listener module 42 may write the network event data structure 86 to the appropriate buffer by utilizing the network entity identifier 23 in the network event data structure 86 to identify the appropriate session bin 107 in the buffer 106. Further, the listener module 42 may copy the time 25 from the network event data structure 86 to the time 25 in the session bin 107 to register the approximate time that the network event data structure 86 was written to the buffer 106. If the listener module 42 determines that a session bin 107 does not exist for the network entity identified by the network entity identifier 23 in the network event data structure 86 then the listener module 42 may create a session bin 107.

FIG. 12 is a flow chart illustrating a method 150 to generate a network event, according to one embodiment.

At operation 151, the application 30 may store the data request 76 in the network event data structure 86 and at operation 152 the application 30 may update the time to the current time.

At decision operation 153, the application 30 determines if the client Internet protocol (IP) address 84 maps to a robot by comparing the client Internet protocol address 84 in the data request 76 to the client Internet protocol addresses 84 in the robot table 70. If a match is found, then a branch is made to operation 154. Otherwise a branch is made to operation 156.

At operation 154, the application 30 asserts the robot flag 90 in the network event data structure 86 and stores the network entity identifier 23 that is associated with the client Internet protocol (IP) address 84 in the robot table 70 in the network event data structure 86.

At operation 156, the application 30 may store flag information 94 and tag information 96 in the network event data structure 86 based on data collected from the data request 76 and at operation 157, the application 30 may store flag information 94 and tag information 96 in the network event data structure 86 based on data collected from the data response 100. For example, the flag information 94 may indicate whether the data request 76 specified to search for "exact phrases" and/or whether the data response 100 (e.g., results) included pictures. As another example, the tag information 96 may indicate whether the data request 76 specified to search in the category "toys" and/or the number of matching data items returned in the data response 100.

Figure 13:
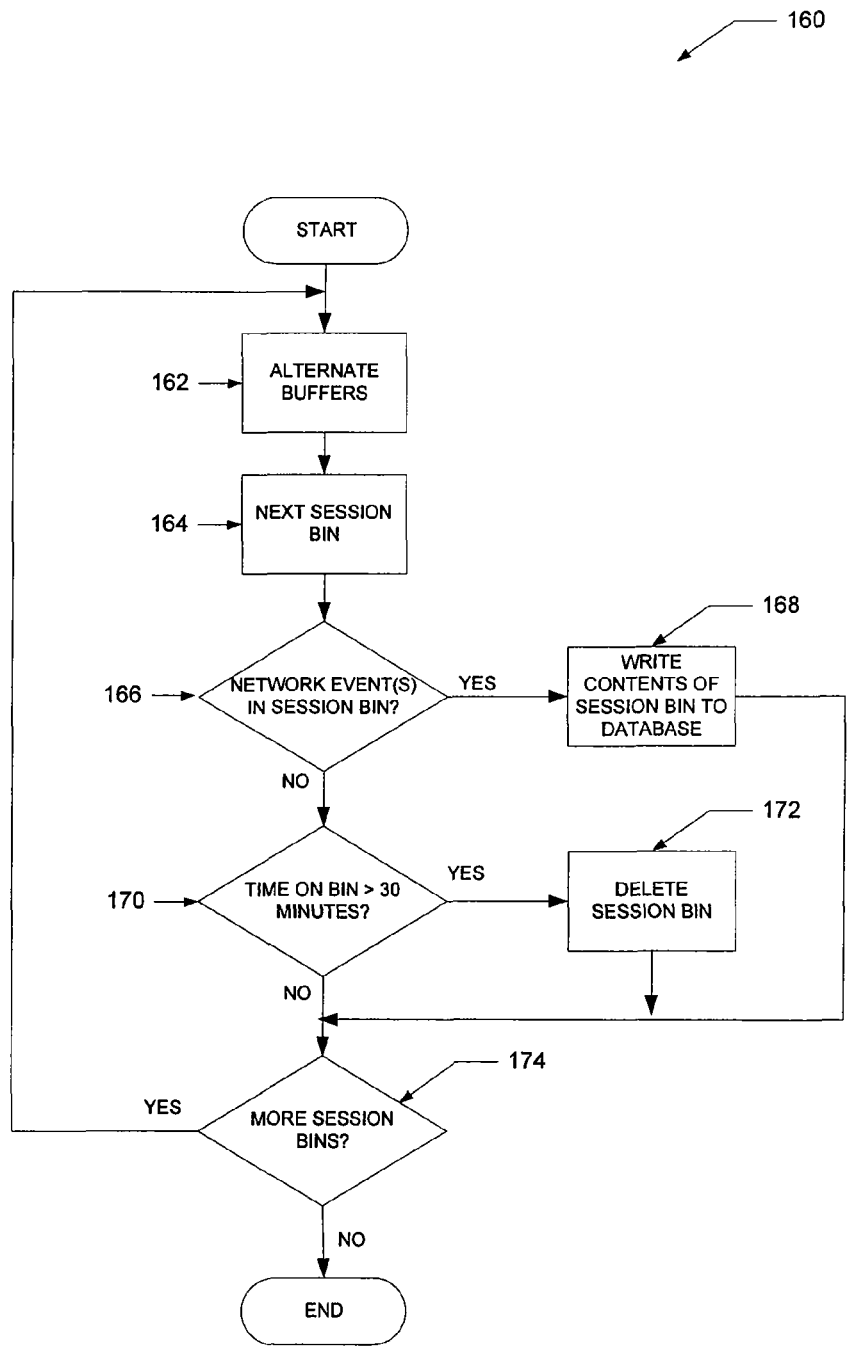
FIG. 13 is a flowchart illustrating a method, according to one embodiment, to flush a buffer to a database.

FIG. 13 is a flow chart illustrating a method 160 to flush a buffer 43 to a database 36, according to one embodiment. The method 160 commences at operation 162 with the listener module 42 alternating buffers 106. For example, the listener module 42 may alternate the functions of buffers 106 A and B by using one buffer 106 to store network events 86 as they arrive and the other buffer 106 to flush the network events 86 to the navigation data table 74 on the database 36.

At operation 164, the listener module 42 gets the next session bin 107 from the buffer 106. At decision operation 166, the listener module 42 determines if there are any network events 86 in the session bin 107. If there are network events 86 in the session bin 107, then a branch is made to operation 168, otherwise, processing continues at decision operation 170.

At operation 168, the listener module 42 writes the contents of the session bin 107 to the appropriate session 116 in the navigation data table 74. At decision operation 170, the listener module 42 determines whether the last network event data structure 86 was written into the session bin 107 more than thirty minutes ago. For example, the listener module 42 may determine if the current time is more than the session time threshold (e.g., thirty minutes) added to the time 25 stored in the session bin 107. Other embodiments may use a session time thresholds of shorter or longer duration. If the last network event data structure 86 was written into the session bin 107 more than thirty minutes prior, then processing continues at operation 172, otherwise processing continues at decision operation 174.

At operation 172, the listener module 42 deletes the session bin 107 in the both buffers 106 (e.g., buffer A and buffer B).

At decision operation 174, the listener module 42 determines if there are more session bins 107 to process. If there are more session bins 107 to process, processing continues at operation 162, otherwise processing ends.

Figure 14:
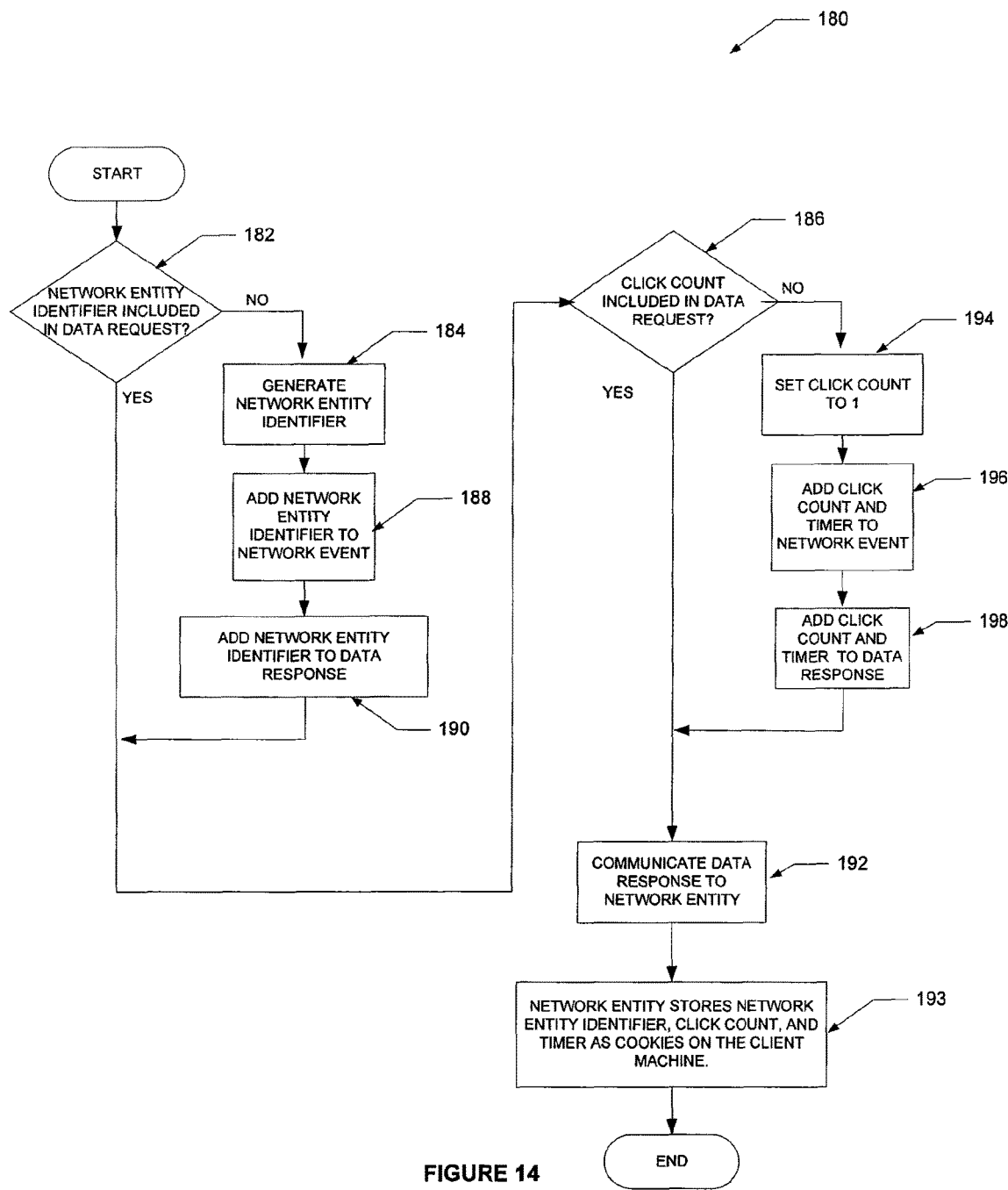
FIG. 14 is a flowchart illustrating a method, according to one embodiment, to generate cookies.

FIG. 14 is a flow chart illustrating a method 180 to generate cookies, according to one embodiment. The method 182 commences at decision operation 182, at the application server 28, with the application 30 determining whether a network entity identifier 23 is included in the data request 76. If a network entity identifier 23 is included in the data request 76, then a branch is made to operation 184. Otherwise a branch is made to decision operation 186.

At operation 184, the application 30 generates a network entity identifier 23 and at operation 188, the application 30 adds the network entity identifier 23 to a network event data structure 86. At operation 190, the application 30 further adds the network entity identifier 23 to the data response 100.

At decision operation 186, the application 30 determines if a click count 27 is included in the data request 76. If the click count 27 is included in the data request 76, then a branch is made to operation 192. Otherwise, a branch is made to operation 194.

At operation 194, the application 30 sets the click count to one. At operation 196, the application 30 adds the click count 27 and the current time 25 to the network event data structure 86. At operation 198, the application 30 writes the click count 27 and the time 25 to the data response 100.

At operation 192, the application 30 communicates the data response 100 to the client machine 20. At operation 193, the client machine 20 may store the network entity identifier 23, the click count 27 and the time 25 as cookies on the client machine 20.

Figure 15:
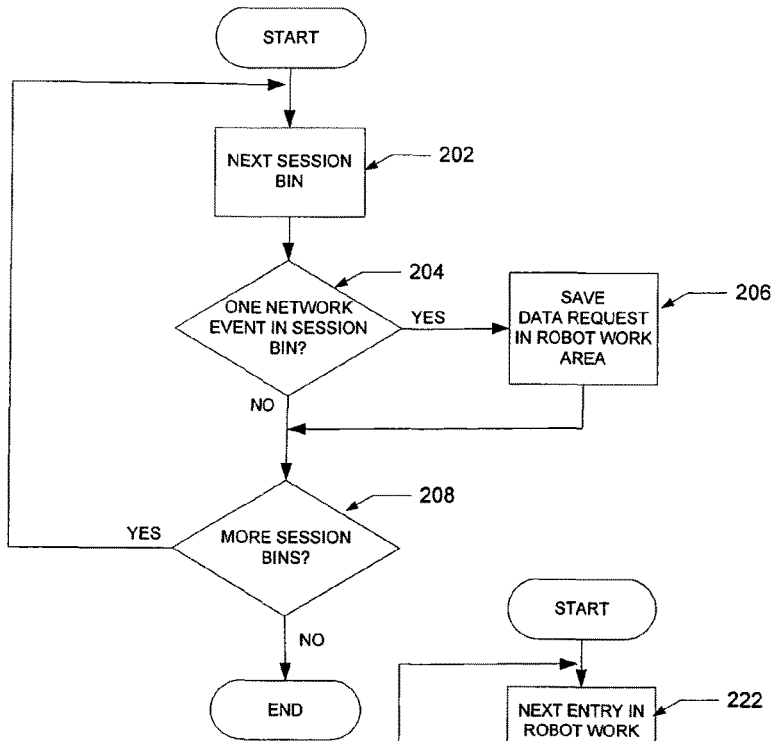
FIG. 15 is a flowchart illustrating a method, according to one embodiment, to save data requests.

FIG. 15 is a flow chart illustrating a method 200 to identify a robot, according to one embodiment. The method 200 commences at operation 202 with the listener module 42 processing the next session bin 107.

At decision operation 204, the listener module 42 determines if there is one network event data structure 86 in the session bin 107. If there is one network event data structure 86 in the session bin 107, then a branch is made to operation 206. Otherwise, a branch is made to decision operation 208.

At operation 206, the listener module 42 saves the data request 76 in a robot work area 71 based on the client Internet protocol (IP) address 84 in the data request. At decision operation 208, the listener module 42 determines if there are more session bins 107. If there are more session bins 107, a branch is made to operation 202. Otherwise, the process ends.

Figure 16:
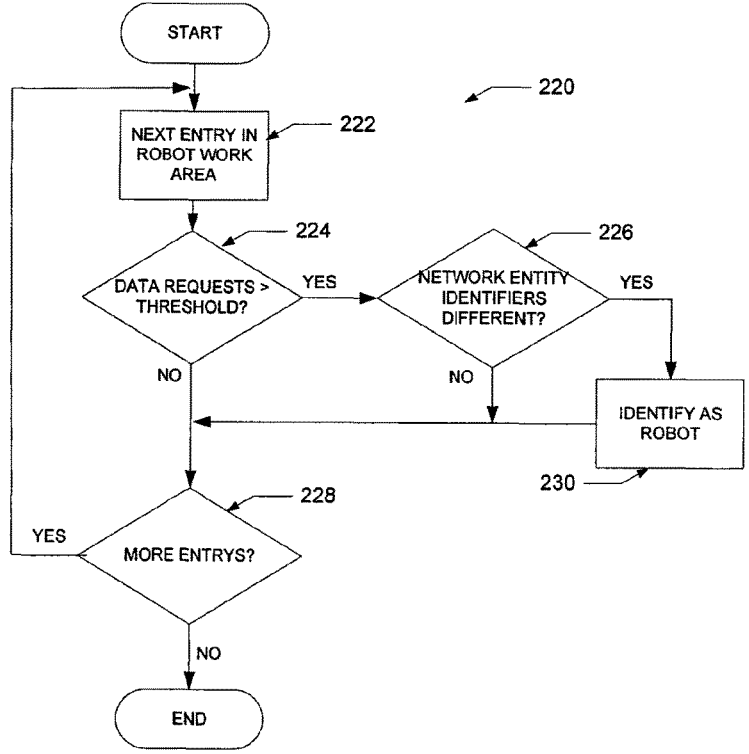
FIG. 16 is a flowchart illustrating a method, according to one embodiment, to identify a robot.

FIG. 16 is a flow chart illustrating a method 220 to identify a robot. At operation 222, the listener module 42 gets the next entry in the robot work area 71.

At decision operation 224, the listener module 42 determines if the number of data requests 76 are greater than a predetermined threshold. If the number of data requests are greater than the predetermined threshold then processing continues at decision operation 226, otherwise processing continues at decision operation 228.

At decision operation 226, the listener module 42 determines if the network entity identifiers 23 are different in each data request 76. If the network entity identifiers 23 are different, then a branch is made to operation 230, otherwise, a branch is made to decision operation 228.

At operation 230, the listener module 42 has identified the client Internet protocol address 84 as being associated with a robot. Accordingly, the listener module 42 allocates a network entity identifier 23 and creates an entry in the robot table 70 that includes the network entity identifier 23 and the client Internet protocol address 84.

At decision operation 228, the listener module 42 determines if there are more entries in the robot work area 71. If there are more entries then a branch is made to operation 222, otherwise, the method 220 ends.

Figure 17:
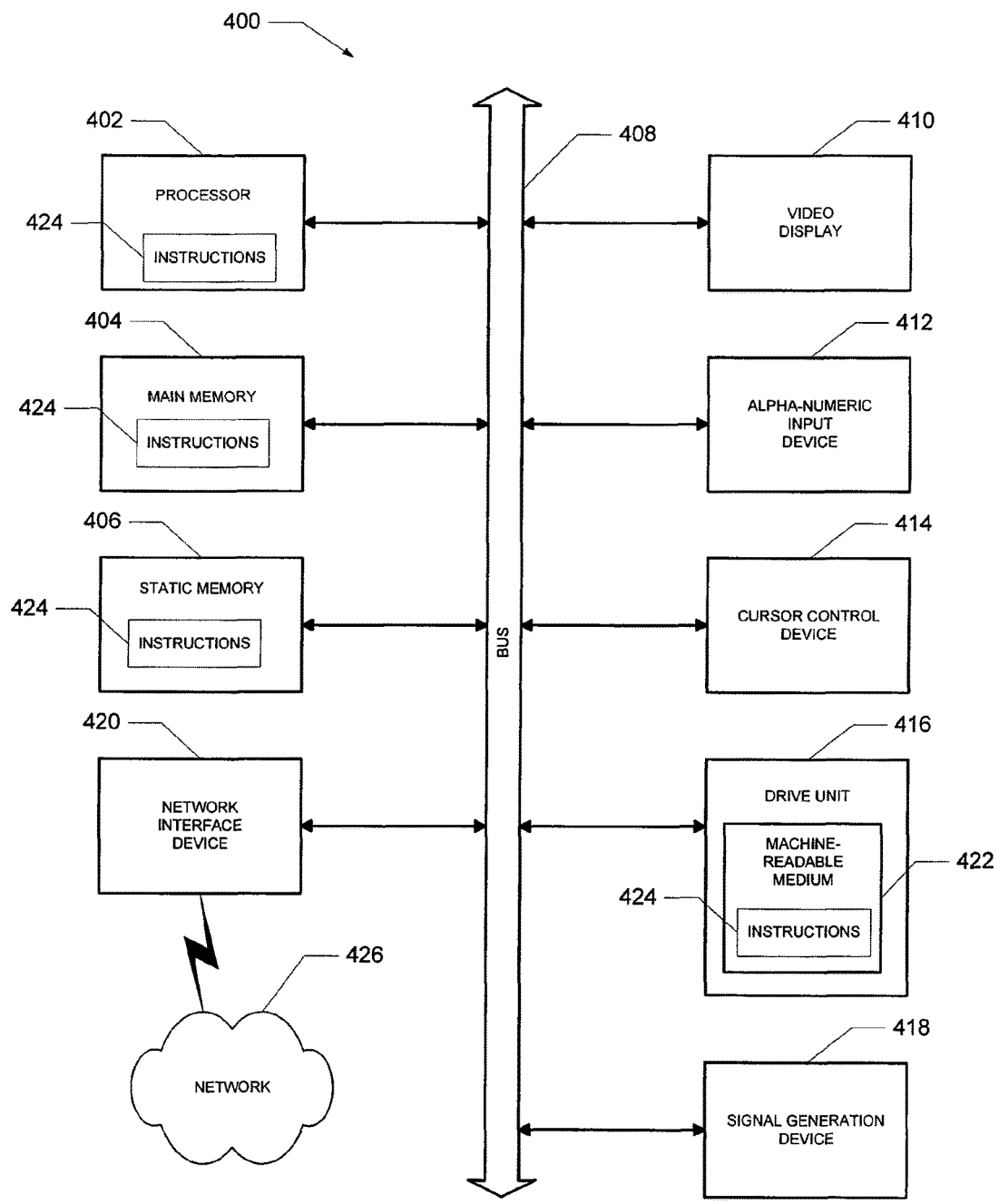
FIG. 17 is a block diagram of a machine, according to one embodiment.

FIG. 17 is a block diagram of a computer system, according to one embodiment. The example computer system 400 or machine or platform includes a processor 402 (e.g., a central processing unit (CPU) a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a cursor control device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions (e.g., software 424) embodying any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

Thus, a method and system to process navigation information have been described. Although the present disclosure has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

What is claimed is:

1. A system to process information, the system comprising:
   at least two hardware processors, the at least two hardware processors configured to perform operations comprising:
   receiving a first network event associated with a first application processing server, the first network event indicating a client identifier for a client and a first network entity identifier, the first network entity identifier included in a first network response generated in response to a first request identifying the client and including a first user interface identifier and not including a network entity identifier, the first application processing server selected to process the first request based on the first user interface identifier included in the first request;
   receiving a second network event associated with a second application processing server indicating the client identifier for the client and a second network entity identifier, the second network entity identifier included in a second network response generated in response to a second request identifying the client and including a second user interface identifier and not including the network entity identifier, the second application processing server selected to process the second request based on the second user interface identifier included in the second request;
   associating the first network event and the second network event based on the client identifier; and
   marking the client as a robot in a database based on the association between the first network event and the second network event and the first and second network entity identifiers included with the first and second network events, respectively;
   determining whether the network events associated with a session indicate different client identifiers; and
   determining the client is a robot in response to the network events indicating different client identifiers.

2. The system of claim 1, wherein the first network event includes navigation information that describes a request for a keyword search of the database.

3. The system of claim 2, wherein the operations further comprise:
   determining a session associated with the first network event; and
   grouping data derived from the first network event with other data associated with the session.

4. The system of claim 1, wherein the operations further comprise:
   storing an association in the database between an Internet Protocol address of the client and a client identifier; and
   generating the first network event to indicate whether the client is indicated in the database.

5. The system of claim 1, wherein the operations further comprise:
   analyzing network events to determine whether the data request is received from a programmatic client.

6. The system of claim 1, further comprising grouping session activity of the client to determine whether the client is returning cookie information previously provided to the client during the session, the session activity previously processed by multiple different application servers; and
   determining whether the client is a robot based at least in part on whether the cookie information is returned.

7. A computer-implemented method to process navigation information, the method comprising:
   receiving a first network event associated with a first application processing server, the first network event indicating a client identifier for a client and a first network entity identifier, the first network entity identifier included in a first network response generated in response to a first request identifying the client and including a first user interface identifier and not including a network entity identifier, the first application processing server selected to process the first request based on the first user interface identifier included in the first request;
   receiving a second network event associated with a second application processing server indicating the client identifier for the client and a second network entity identifier, the second network entity identifier included in a second network response generated in response to a second request identifying the client and including a second user interface identifier and not including the network entity identifier, the second application processing server selected to process the second request based on the second user interface identifier included in the second request;
   associating the first network event and the second network event based on the client identifier; and
   marking the client as a robot in a database based on the association between the first network event and the second network event and the first and second network entity identifiers included with the first and second network events, respectively;
   determining whether the network events associated with a session indicate different client identifiers; and
   determining the client is a robot in response to the network events indicating different client identifiers.

8. The method of claim 7, wherein the first network event includes navigation information that describes a request for a keyword search of the database.

9. The method of claim 8, wherein navigation information describes a web page.

10. The method of claim 8, wherein the navigation information describes the first request.

11. The method of claim 7, wherein the first request includes a request to return search results.

12. The method of claim 7, further comprising:
    analyzing network events to determine whether the first request is received from a programmatic client.

13. The method of claim 7, wherein the first request is associated with an anonymous user.

14. A non-transitory machine-readable medium storing processor-executable instructions which, when executed by hardware processing circuitry, cause the hardware processing circuitry to perform operations comprising:
    receiving a first network event associated with a first application processing server, the first network event indicating a client identifier for a client and a first network entity identifier, the first network entity identifier included in a first network response generated in response to a first request identifying the client and including a first user interface identifier and not including a network entity identifier, the first application processing server selected to process the first request based on the first user interface identifier included in the first request;

receiving a second network event associated with a second application processing server indicating the client identifier for the client and a second network entity identifier, the second network entity identifier included in a second network response generated in response to a second request identifying the client and including a second user interface identifier and not including the network entity identifier, the second application processing server selected to process the second request based on the second user interface identifier included in the second request;

associating the first network event and the second network event based on the client identifier; and marking the client as a robot in a database based on the association between the first network event and the second network event and the first and second network entity identifiers included with the first and second network events, respectively;

determining whether the network events associated with a session indicate different client identifiers; and determining the client is a robot in response to the network events indicating different client identifiers.

15. The machine-readable medium of claim 14, wherein the first network event includes navigation information that describes a request for a keyword search of the database.

16. The machine-readable medium of claim 15, wherein navigation information describes a web page.

17. The machine-readable medium of claim 15, wherein the navigation information describes the first request.

18. The machine-readable medium of claim 14, wherein the first request includes a request to return search results.

19. The machine-readable medium of claim 14, the operations further comprising:

analyzing network events to determine whether the first request is received from a programmatic client.

\* \* \* \* \*